United States Patent

[11] 3,627,845

[72] Inventors Richard A. Hickner;
Howard L. Young, both of Midland, Mich.
[21] Appl. No. 751,371
[22] Filed Aug. 9, 1968
[45] Patented Dec. 14, 1971
[73] Assignee The Dow Chemical Company
Midland, Mich.
Continuation-in-part of application Ser. No. 573,500, Aug. 19, 1966, now abandoned. This application Aug. 9, 1968, Ser. No. 751,371

[54] POLYLOXY ALKYLENE SULFIDES
9 Claims, No Drawings
[52] U.S. Cl. .................................................. 260/609 A,
252/161, 260/607 A, 260/609 F, 424/337
[51] Int. Cl. ............................................. C07c
149/14
[50] Field of Search ............................................. 260/607 A,
609 A, 609 F; 252/161

[56] References Cited
UNITED STATES PATENTS
2,864,866 12/1958 Louthan ........................ 260/607
3,135,804 6/1964 Von Brachel et al. ........ 260/609
3,174,900 3/1965 Wyant ........................... 260/609
3,288,858 11/1966 Lyness et al. ................. 260/607
3,346,504 10/1967 Herrmann ..................... 260/607 UX Primary Examiner—Joseph P. Brust
Assistant Examiner—D. R. Phillips
Attorneys—Griswold & Burdick and James R. Lochhead ABSTRACT: Compounds of the formula

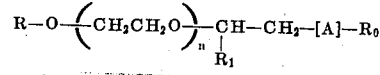

wherein R is an alkyl or aralkyl group; each n is an integer of from five to 50; A is a sulfide, sulfoxide or sulfone group; $R_1$ is hydrogen or a lower alkyl group; and $R_o$ is a halophenyl group, an alkyl or aralkyl group, halophenylethyl or halobenzyl group, or a group, or a group of the formula

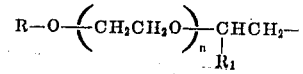

wherein R, $R_1$ and n are defined above. These compositions have surfactant and/or biological utilities.

POLYLOXY ALKYLENE SULFIDES

CROSS-REFERENCE TO RELATED APPLICATION

This is a continuation-in-part of application, Ser. No. 573,500, filed Aug. 19, 1966, now abandoned.

SUMMARY OF THE INVENTION

This invention relates to novel compositions of matter having useful surfactant and/or biological properties and to methods of preparing such compositions. More particularly, the present invention relates to aromatic or alkyl sulfur-containing polyoxyalkylene surfactant compounds with low foam characteristics, some of which are very active for the control of certain specific insect pests, for preventing the growth of particular strains of fungi, in the control of mites and as anthelmintics.

The condensation of a beta-hydroxyethyl sulfide with a compound containing a hydroxyl group is a known reaction. Broad classes of diverse reaction products (useful primarily as synthetic lubricants) have been prepared by means of this reaction, as disclosed, for example, in U.S. Pat. No. 2,582,605 to Richter et al. Classes of sulfone compounds which contain polyoxyalkylene groups are also known (U.S. Pat. No. 2,378,551 to Hentrich et al. and U.S. Pat. No. 2,474,808 to Schoene).

The compounds of the present invention may be represented by the formula $$R{-}O{-}(CH_2CH_2O)_n{-}CHCH_2{-}[A]{-}R_0 \quad (I)$$
$$\hspace{3.5cm} |$$
$$\hspace{3.5cm} R_1$$

wherein R is an alkyl group of from 10 to 18 carbon atoms or an alkyl phenyl group of from 14 to 24 carbon atoms, $n$ is an integer of from five to 50, —A— is a divalent sulfur, sulfoxide or sulfone group $$(-S-, -\overset{O}{\underset{\|}{S}}- \text{ or } -\overset{O}{\underset{\|}{\overset{\|}{S}}}-),$$

$R_1$ is hydrogen or an alkyl group of from one to four carbon atoms, and $R_0$ is a halophenyl group, an alkyl group of from one to 12 carbon atoms (preferably three to eight carbon atoms), an aryl-containing hydrocarbon group, preferably monocyclic, of no more than 10 carbon atoms (such as a phenyl, o-, m- or p-cumenyl, β-naphthyl, tolyl, xylyl, duryl, phenethyl or a benzyl group), a halophenylethyl group (such as p-chlorophenethyl), a halobenzyl group (such as o-, m- or p-bromobenzyl), or a group of the formula

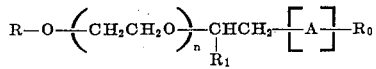

wherein R, $R_1$ and $n$ are as defined above. Preferred halogens in the above compounds are bromine and chlorine.

The compositions of the present invention are prepared according to the following reactions:

(1)
(a) $2\ R{-}O{-}(CH_2CH_2O)_n{-}H$
$\hspace{1cm} +HOCHCH_2SCH_2CHOH \xrightarrow[{[H+]}]{-2H_2O}$
$\hspace{2.5cm} |\hspace{1.8cm} |$
$\hspace{2.5cm} R_1\hspace{1.5cm} R_1$ (b)
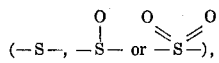

(c)
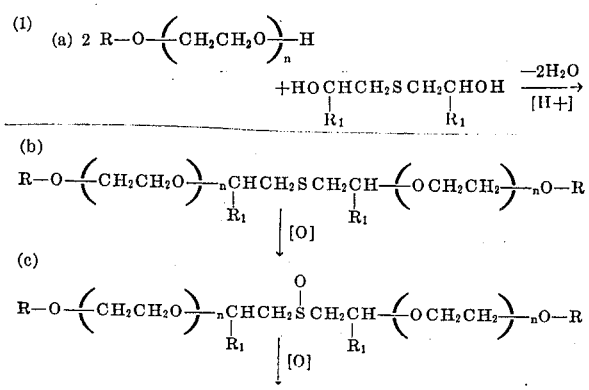

(2)
(a)
$R{-}O{-}(CH_2CH_2O)_n{-}CHCH_2SCH_2CH{-}(OCH_2CH_2)_n{-}O{-}R$
$\hspace{4cm} |\hspace{2.2cm} |$
$\hspace{4cm} R_1\hspace{2cm} R_2$ (b)
$R{-}O{-}(CH_2CH_2O)_n{-}H + R_0SCH_2CHOH \xrightarrow{-H_2O}$
$\hspace{5.5cm} |$
$\hspace{5.5cm} R_1$

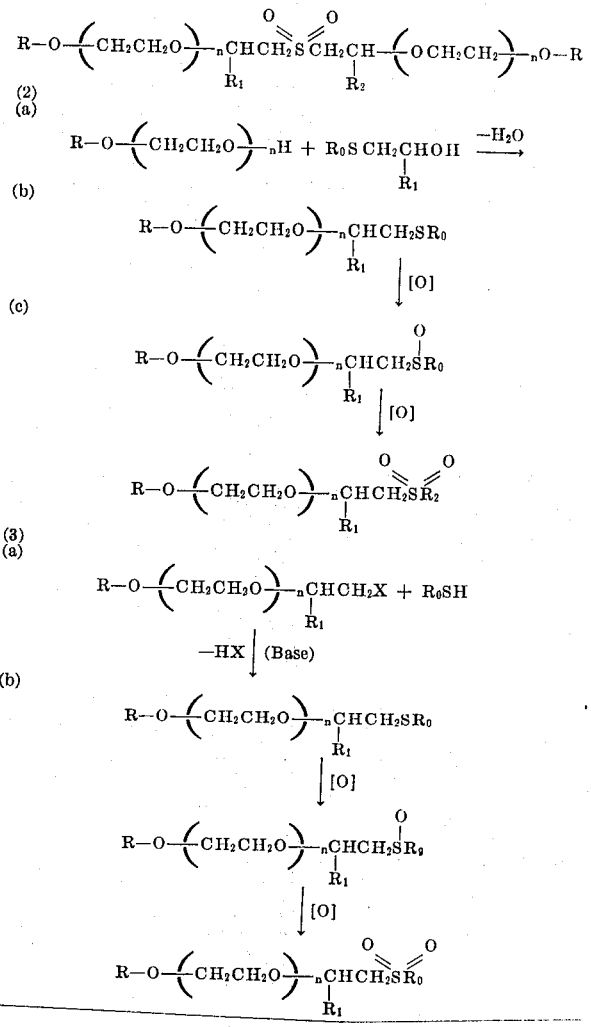

(3)
(a)
$R{-}O{-}(CH_2CH_2O)_n{-}CHCH_2X + R_0SH$
$\hspace{3.5cm} |$
$\hspace{3.5cm} R_1$
$\hspace{2cm} -HX \downarrow \text{(Base)}$ (b)
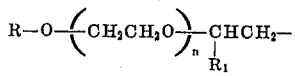

wherein X is a halogen (Cl, Br, F or I); R is as defined above and is preferably a straight chain alkyl group of from 12 to 16 carbon atoms, or an alkylphenyl group of 14 to 18 carbon atoms, said alkyl groups or alkyl substituents being, for instance, lower alkyl groups of from one to four carbon atoms, a straight or branched chain pentyl, hexyl, octyl, nonyl, decyl, undecyl or dodecyl group, and $n$ is as defined above and preferably from nine to 50, more preferably 15-40.

The initial condensation reaction (1) (a) or (2) (a) is carried out in the presence of an acid catalyst, preferably using an oxyalkylated alkylphenol wherein the alkyl substituent on the benzene ring is a branched chain alkyl group of from eight to 12 carbon atoms or an oxyalkylated alcohol containing 10 to 18 carbon atoms in the alcohol moiety. The water produced by the condensation reaction may be removed by azeotropic distillation or by other conventional means. Typical catalysts which may be used for the condensation steps of reactions (1) (a) and (2) (a) include para-toluene sulfonic acid, phosphoric acid and sulfonated ion exchange resins (based on styrene divinylbenzene copolymer). The condensation product may be oxidized to the sulfoxide and/or sulfone in situ according to reactions (1)(b), (c) and (2)(b), (c) or the product may be separated and purified prior to oxidation. Any conventional oxidizing agent which does not cleave the molecule may be used to form the sulfoxide and sulfone products. Aqueous hydrogen peroxide has been found to be very suitable for this purpose. To form the sulfoxide products, the sulfides are treated with the theoretical amount of 30 percent hydrogen peroxide in acetone or acetic acid at room temperature. The sulfones may be prepared by oxidizing either the sulfides or sulfoxides at elevated temperature (above room temperature)

with an excess of hydrogen peroxide in glacial acetic acid or with potassium permanganate.

Reaction (3)(a) is ordinarily carried out in the presence of a base of an acid acceptor. The reaction can also be carried out with a mercaptan salt such as NaSR₀ or KSR₀ wherein R₀ is as previously defined. The resulting sulfide product is then oxidized in the same manner as in reactions (1)(b), (c) and (2)(b), (c) to the corresponding sulfoxides and/or sulfones. The halogenated starting materials of reaction (3) may be prepared by heating an ethoxylated phenol or alcohol of the types described previously (Reaction I) with about 5 moles of thionyl chloride at 40°–60° C. until the hydroxyl groups are all replaced as shown by the infrared spectrum. Ordinarily, from 4 to 6 hours is sufficient to affect replacement. The use of an inert diluent such as methylene chloride is useful to facilitate stirring.

SPECIFIC EMBODIMENTS

Typical reactions include the following:

(I)
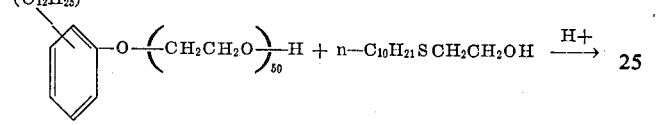
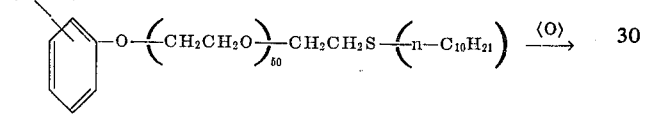
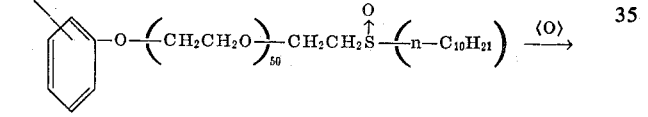
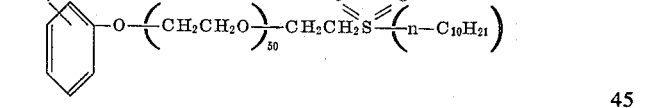

(II)
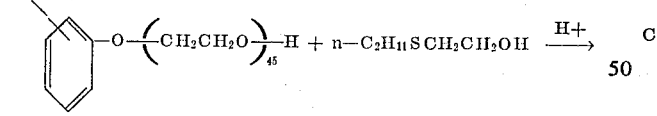
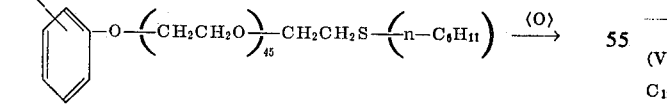
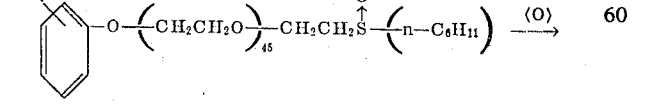
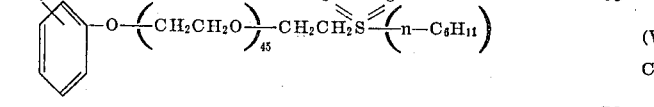

(III)

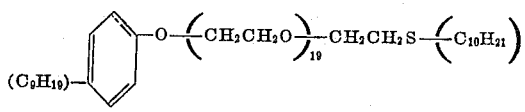
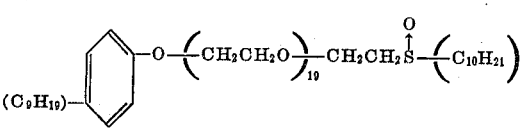
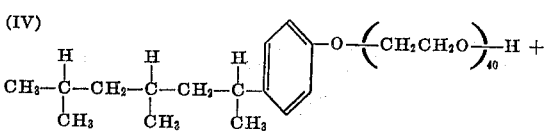

(IV)
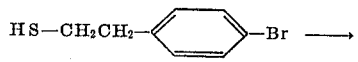
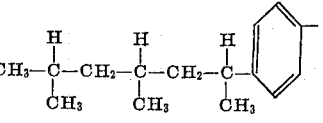
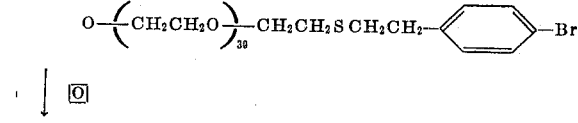
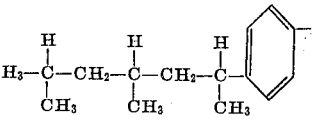
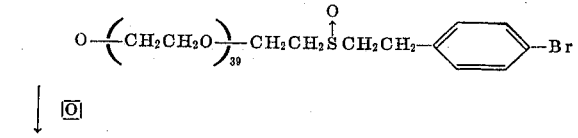
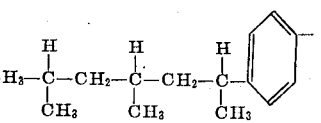
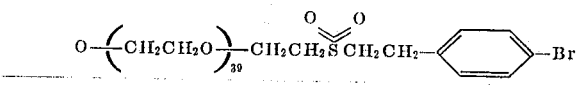

(V)*
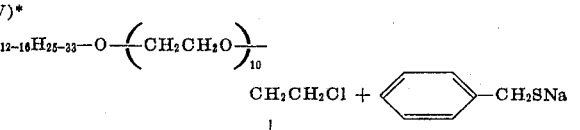
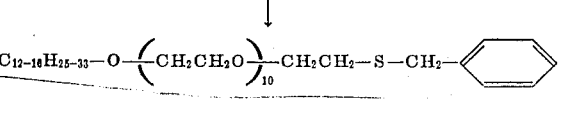

(VI)
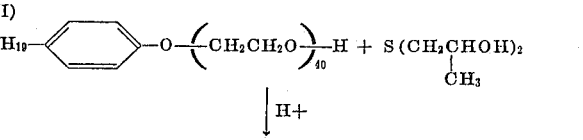
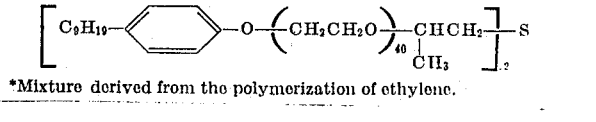

*Mixture derived from the polymerization of ethylene.

The compounds produced according to the present invention exhibit surprising low-foam surfactant properties. This is unusual in view of the fact the unmodified ethoxylated alkylphenols and alcohols are high-foaming surfactants. Furthermore, many of the compounds (as well as mixtures of such compounds produced according to the invention are active fungicides, acaricides and anthelmintics. Surfactants with low foaming characteristics are particularly desirable for use in agricultural sprays and in latex paint formulations. All of the compounds which have a chlorophenyl substituent have been found to be useful active anthelmintic agents.

GENERAL METHOD A

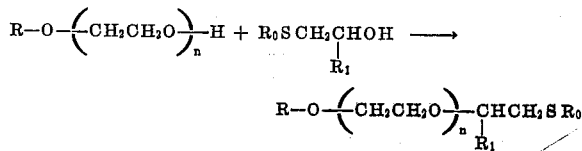

In this reaction, the values of $n$ and the substituents represented by R and $R_0$ are given in table I, along with the amounts of reactants used and the yields obtained.

In a typical preparation, equivalent amounts of ethoxylated alkylphenol or alcohol and β-hydroxyethyl sulfide were dissolved in toluene or xylene (about 750 milliliters of toluene or xylene/0.1 equivalent of ethoxylated alkylphenol) with 0.1 gram p-toluenesulfonic acid for each 0.1 equivalent of ethoxylated alkylphenol or alcohol. The solution was heated to reflux and the solvent-water azeotrope was gradually removed. The reactor temperature rose from about 110° to 160° C. When no more water was formed, the reaction mixture was cooled, neutralized with a basic ion exchange resin or $Ba(OH)_2$, filtered and the solvent removed from the final sulfide product at reduced pressure.

GENERAL METHOD B

Oxidation of the sulfide (produced by General Method A or D) to the sulfoxide was carried out by the dropwise addition of 30 percent aqueous hydrogen peroxide to the sulfide at temperatures of from room temperature to about 60° C. The amounts of reactants used for the oxidation are given in table I.

GENERAL METHOD C

Oxidation of the sulfide (or sulfoxide) from either General Method A, B or D to the sulfone was carried out by the dropwise addition of 30 percent aqueous hydrogen peroxide to either the sulfide or sulfoxide at temperatures of from 20° to 60° C. The amounts of reactants and yields obtained are given in table I. Peracetic acid was also used to prepare the sulfones.

GENERAL METHOD D

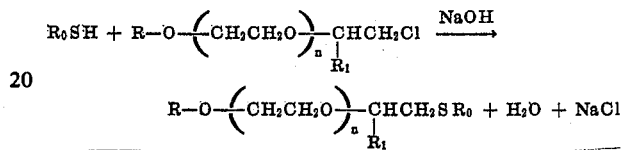

To a 0.1 mole sample of the mercaptan ($R_1SH$) in 100–200 milliliters of isopropanol was added 0.1 mole of NaOH (powdered or pellets) and the mixture stirred for one-half hour to form the sodium salt of the mercaptan. The chlorinated ethoxylated nonylphenol or alcohol (dispersed in 25–50 milliliters of isopropanol) was then added dropwise to the mercaptan salt over a period of 30 minutes and the resulting mixture heated to reflux (about 80° C.) and refluxed for from 2 to 4 hours. The resulting reaction products were filtered to remove the solid NaCl and the filtrate subjected to distillation under reduced pressure to remove the isopropanol solvent. Reactants, products, amounts and yields are recorded and summarized in table I.

Table I has been broken into two sections for a systematic presentation of the experimental data. Table II shows the compounds and their properties in the same numerical order.

TABLE I

| Ex. No. | Reactants I | Reactants II | Amounts of reactants I | Amounts of reactants II |
| --- | --- | --- | --- | --- |
| 1 | $C_9H_{19}$—⟨phenyl⟩—O—$(CH_2CH_2O)_{20}$H | S—$(CH_2CH_2OH)_2$ | 770 grams (0.7 mole). | 42.8 grams (0.35 mole). |
| 2 | Same as above | $CH_3$—$(CH_2)_3$S—$CH_2CH_2OH$ | 99 grams (.09 mole). | 12.06 grams (.09 mole). |
| 3 | $C_9H_{19}$—⟨phenyl⟩—O—$(CH_2CH_2O)_{20}$—$CH_2CH_2$—S—$(CH_2)_3CH_3$ | $H_2O_2$ | 48.64 grams (.04 mole). | 9.07 grams, 30 percent aqueous $H_2O_2$ (.08 mole). |
| 4 | $C_9H_{19}$—⟨phenyl⟩—O—$(CH_2CH_2O)_{20}$H | $CH_3$—$(CH_2)_7$S—$CH_2CH_2OH$ | 220 grams (0.2 mole). | 38 grams (0.2 mole). |
| 5 | Same as above | Cl—⟨phenyl⟩—S—$CH_2CH_2OH$ | 110 grams (0.1 mole). | 18.806 grams (0.1 mole). |
| 6 | $C_9H_{19}$—⟨phenyl⟩—O—$(CH_2CH_2O)_{40}$H | Same as above | 198 grams (0.1 mole). | 18.806 grams (0.1 mole). |
| 7 | Same as above | S—$(CH_2CH_2OH)_2$ | 398 grams (0.2 mole). | 12.4 grams (0.1 mole). |
| 8 | $C_9H_{19}$—⟨phenyl⟩—O—$(CH_2CH_2O)_{19}$—$CH_2CH_2Cl$ | $C_{10}H_{21}SH$ | 55.0 grams (.05 mole). | 8.72 grams (.05 mole). |
| 9 | $C_9H_{19}$—⟨phenyl⟩—O—$(CH_2CH_2O)_{15}$—$CH_2CH_2$—S—$CH_2CH_2CH_3$ | $H_2O_2$ | 39.28 grams (.04 mole). | 9.07 grams (.08 mole). |
| 10 | $C_9H_{19}$—⟨phenyl⟩—O—$(CH_2CH_2O)_{15}$H | Cl—⟨phenyl⟩—S—$CH_2CH_2OH$ | 88 grams (0.1 mole). | 18.8 grams (0.1 mole). |

TABLE I—Continued

| Ex. No. | Reactants I | Reactants II | Amounts of reactants I | Amounts of reactants II |
|---|---|---|---|---|
| 11 | $C_9H_{19}$—⟨phenyl⟩—O—$(CH_2CH_2O)_{19}$—$CH_2CH_2$—S—$C_{10}H_{21}$ | $H_2O_2$ | 35 grams (0.0275 mole). | 3.117 grams, 30 percent in (.0275 mole). |
| 12 | $C_9H_{19}$—⟨phenyl⟩—O—$(CH_2CH_2O)_{19}$—$CH_2CH_2Cl$ | ⟨phenyl⟩—$CH_2SH$ | 80.5 grams (0.07 mole). | 8.68 grams (.07 mole). |
| 13 | Same as above | ⟨phenyl⟩—$CH_2CH_2SH$ | 80.5 grams (0.07 mole). | 9.68 grams (0.07 mole). |
| 14 | $C_9H_{19}$—⟨phenyl⟩—O—$(CH_2CH_2O)_{15}$—H | $(HOCH_2CH_2)_2S$ | 176.0 grams (0.2 mole). | 12.2 grams (0.1 mole). |
| 15 | $[C_9H_{19}$—⟨phenyl⟩—O—$(CH_2CH_2O)_{15}$—$CH_2CH_2]_2$—S | $CH_3$—C(=O)—O—OH | 88.0 grams (0.1 mole). | 15.96 grams (0.21 mole). |
| 16 | $C_9H_{12}$—⟨phenyl⟩—O—$(CH_2CH_2O)_9$—H | $(HOCH_2CH_2)_2S$ | 125.2 grams (0.2 mole). | 12.2 grams (0.1 mole). |
| 17 | $[C_9H_{19}$—⟨phenyl⟩—O—$(CH_2CH_2O)_9$—$CH_2CH_2]_2$—S | $CH_3$—C(=O)—O—OH | 131.8 grams (0.1 mole). | 15.96 grams (0.21 mole). |
| 18 | $[C_8H_{15}$—⟨phenyl⟩—O—$(CH_2CH_2O)_{15}$—$CH_2CH_2]_2$—S | $H_2O_2$ | 48.3 grams (0.05 mole). | 5.63 grams of 30% $H_2O_2$ in water. |
| 19 | $C_9H_{19}$—⟨phenyl⟩—O—$(CH_2CH_2O)_{15}$—H | $CH_3CH_2CH_2SCH_2CH_2OH$ | 96.08 grams (0.11 mole). | 13.02 grams (0.11 mole). |
| 20 | $C_{12}H_{25}$—O—$(CH_2CH_2O)_{23}$—H | n-$C_8H_{17}SCH_2CH_2OH$ | 7 148 grams (0.1 mole). | 7 19 grams (0.1 mole). |
| 21 | $C_{12-16}H_{25-33}$—O—$(CH_2CH_2O)_9$—$CH_2CH_2Cl$ | ⟨phenyl⟩—$CH_2SH$ | 14 36.0 grams (0.05 mole). | 14 6.21 grams (0.05 mole). |
| 22 | $C_9H_{19}$—⟨phenyl⟩—O—$(CH_2CH_2O)_{40}$—H | $S(CH_2CHOH)_2CH_3$ | 7 110 grams (0.1 mole). | 14 7.5 grams (0.05 mole). |

TABLE I.—SECTION 2

| Example Number | Method of preparation | Yield (percent of theory) | Compound prepared | Physical properties of compound |
|---|---|---|---|---|
| 1 | A | 83 | $[C_9H_{19}$—⟨phenyl⟩—O—$(CH_2CH_2O)_{20}$—$CH_2CH_2]_2$—S | Whitish waxy solid. |
| 2 | A | 79.6 | $C_9H_{19}$—⟨phenyl⟩—O—$(CH_2CH_2O)_{20}$—$CH_2CH_2S$—$(CH_2)_3$—$CH_3$ | Clear amber solid at room temperature. |
| 3 | C | 88.9 | $C_9H_{19}$—⟨phenyl⟩—O—$(CH_2CH_2O)_{20}$—$CH_2CH_2$—S(=O)(=O)—$(CH_2)_3$—$CH_3$ | Dark yellow liquid. |
| 4 | A | —— | $C_9H_{19}$—⟨phenyl⟩—O—$(CH_2CH_2O)_{20}$—$CH_2CH_2$—S—$(CH_2)_7$—$CH_3$ | White waxy solid |
| 5 | A | 86.5 | $C_9H_{19}$—⟨phenyl⟩—O—$(CH_2CH_2O)_{20}$—$CH_2CH_2$—S—⟨phenyl⟩—Cl | Amber waxy solid. |
| 6 | A | 89.3 | $C_9H_{19}$—⟨phenyl⟩—O—$(CH_2CH_2O)_{40}$—$CH_2CH_2$—S—⟨phenyl⟩—Cl | Light brown waxy solid. |
| 7 | A | 86.6 | $[C_9H_{19}$—⟨phenyl⟩—O—$(CH_2CH_2O)_{40}$—$CH_2CH_2]_2$—S | Tan waxy solid. |
| 8 | D | 70.3 | $C_9H_{19}$—⟨phenyl⟩—O—$(CH_2CH_2O)_{19}$—$CH_2CH_2$—S—$C_{10}H_{21}$ | Light tan waxy solid. |
| 9 | C | 76.0 | $C_9H_{19}$—⟨phenyl⟩—O—$(CH_2CH_2O)_{15}$—$CH_2CH_2$—S—$CH_2CH_2CH_3$ | Light green liquid. |
| 10 | A | 88.8 | $C_9H_{19}$—⟨phenyl⟩—O—$(CH_2CH_2O)_{15}$—$CH_2CH_2$—S—⟨phenyl⟩—Cl | Medium dark brown liquid. |

TABLE I.—SECTION 2—Continued

| Example Number | Method of preparation | Yield (percent of theory) | Compound prepared | Physical properties of compound |
|---|---|---|---|---|
| 11 | B | 67.8 | $C_9H_{19}$—⟨⟩—O—$(CH_2CH_2O)_{19}$—$CH_2CH_2$—$\overset{O}{\underset{\uparrow}{S}}$—$C_{10}H_{21}$ | Amber waxy solid. |
| 12 | C | 90.0 | $C_9H_{19}$—⟨⟩—O—$(CH_2CH_2O)_{19}$—$CH_2CH_2$—S—$CH_2$—⟨⟩ | Light gray solid. |
| 13 | D | 87.4 | $C_9H_{19}$—⟨⟩—O—$(CH_2CH_2O)_{19}$—$CH_2CH_2$—S—$CH_2CH_2$—⟨⟩ | Gray waxy solid. |
| 14 | A | 86.6 | $[C_9H_{19}$—⟨⟩—O—$(CH_2CH_2O)_{15}$—$CH_2CH_2$—$]_2$S | Do. |
| 15 | C | 66.9 | $[C_9H_{19}$—⟨⟩—O—$(CH_2CH_2O)_{15}$—$CH_2CH_2$—$]_2$S$\underset{\diagdown O}{\overset{\diagup O}{}}$ | Dark amber liquid. |
| 16 | A | 93.4 | $[C_9H_{19}$—⟨⟩—O—$(CH_2CH_2O)_9$—$CH_2CH_2$—$]_2$S | Dark brown liquid. |
| 17 | C | 82.6 | $[C_9H_{19}$—⟨⟩—O—$(CH_2CH_2O)_9$—$CH_2CH_2$—$]_2$S$\underset{\diagdown O}{\overset{\diagup O}{}}$ | Do. |
| 18 | B | 50.0 | $[C_9H_{19}$—⟨⟩—O—$(CH_2CH_2O)_{15}$—$CH_2CH$—$]_2$S$\underset{\diagdown O}{\overset{\diagup O}{}}$ | Amber viscous liquid. |
| 19 | A | 88.8 | $C_9H_{19}$—⟨⟩—O—$(CH_2CH_2O)_{15}$—$CH_2CH_2$—S—$CH_2CH_2CH_3$ | Amber liquid. |
| 20 | A | 85.0 | $C_{12}H_{25}$—O—$(CH_2CH_2O)_{23}$—$CH_2CH_2$—S—$C_8H_{17}$ | Brown, viscous liquid. |
| 21 | D | 90.0 | $C_{12-16}H_{25-33}$—O—$(CH_2CH_2O)$—$CH_2CH_2$—S—$CH_2$—⟨⟩ | Do. |
| 22 | A | 87.0 | $[C_9H_{19}$—⟨⟩—O—$(CH_2CH_2O)_{40}$—$\underset{CH_3}{CHCH_2}]_2$S | Do. |

Table II summarizes the useful properties of the compounds of the invention, giving the surfactant profiles of the compounds and several specialized biological utilities. The surface tension and interfacial tension (water-mineral oil) of a 0.1 percent by weight solution of the indicated compound in distilled water is given. In addition, the initial foam height and the height after 5 minutes was measured. This foam height test illustrates the low foaming characteristics of the class of compounds prepared according to the present invention. The wetting time shows that the sulfur-containing compounds of the invention retain excellent emulsifying and dispersive power, even though the foaming properties have been reduced.

The biological results reported in table II were obtained as follows:

Cercospora beticola
Candida albicans
Trichophyton mentagrophytes

These organisms were seeded over the surface of nutrient agar which had been poured into large flat pans. Droplets of solutions of the chemical compounds shown in table II were spaced over the surface of the agar and cleared zones of inhibition observed after a suitable incubation period. The concentration given in table II shows the lowest concentration of the compound which gives a cleared zone. The compounds were dissolved in water or isopropanol prior to seeding.

Powdery (bean) mildew (*Erysphe polygoni*)

The host bean plant is sprayed with an aqueous dispersion of the chemical at the concentration indicated in table II. The plants are sprayed to a point just short of runoff. After the spray deposit has dried, plants are placed on a greenhouse bench. Heavily mildewed plants are randomly placed among the inoculated plants. Air currents are sufficient to carry spores from mildewed to uninoculated plants. Readings are taken 14 days after uninoculated plants are placed in the same area with the mildewed plants. A figure of 100 means complete control of the disease.

Lone Star tick (*Amblyomma americanum*)

Nymphs of the Lone Star tick were dipped into an acetone solution of the compounds indicated in table II. The impregnated ticks were then placed on absorbent paper to remove the excess solution and to dry before being placed into vials. Readings are taken the 4th day after treatment. A figure of 100 indicates a 100 percent kill at the concentration given.

Mouse Pinworms

Medicated diets containing the compounds indicated in table II were fed to mice naturally infected with pinworms. Necropsy findings at the termination of the tests (7 days) were the basis of the test evaluation. Activity against pinworms is interpreted as 100 percent or is of no calculable effect.

TABLE II $$R-O-\left(CHCH_2\right)_n-A-R_0^1$$
$$\quad\quad\quad\quad R_1$$

| Example Number | Compound | | | | Biological activity | | Surfactant profile | | | | Wetting time (mins.) |
|---|---|---|---|---|---|---|---|---|---|---|---|
| | $R_0$ | $n$ | $A$ | $R_0^1$ | Species | Conc. (p.p.m.) | Percent kill | Surface tension (dynes/cm.) | Interfacial tension (dynes/cm.) | Foam height (mm.) 0 min. / 5 min. | |
| 1 | $-CH_2CH_2-\bigcirc-OCH_2CH_2)_{20}$ | 20 | S | $-\bigcirc-(C_9H_{19})$ | Bean mildew | 4,000 | 100 | | | | |
| 2 | $-(CH_2)_3CH_3$ | 20 | S | | Cercospora beticola / Trichophyton mentagrophytes | 100 / 100 | 100 / 100 | 32.3 | 4.8 | 67 / 6 | 0.20 |
| 3 | $-(CH_2)_3CH_3$ | 20 | $\overset{O}{\underset{O}{S}}$ | | | | | 35.1 | 8.2 | 100 / 18 | 0.95 / 1568–69 |
| 4 | $-(CH_2)_7CH_3$ | 20 | S | | Bean aphis / Bean mildew | 500 / 4,000 | 100 / 100 | 30.6 | 2.9 | 49 / 22 | 0.45 |
| 5 | $-\bigcirc-Cl$ | 20 | S | | Lone Star tick / Mouse pinworm, percent | 500 / 0.06 | 100 / 100 | 36.7 | 5.9 | 92 / 25 | 0.82 |
| 6 | Same as above | 40 | S | | do | | | 40.6 | 13.2 | 87 / 13 | 4 |
| 7 | $-CH_2CH_2-\bigcirc-OCH_2CH_2)_{40}$ | 40 | S | $-\bigcirc-(C_9H_{19})$ | | | | 40.1 | 13.6 | 46 / 37 | 0.75 |
| 8 |  $-(C_{10}H_{21})$ | 19 | S | | | | | 30.3 | 2.5 | 33 / 28 | 0.82 |
| 9 | $-CH_2CH_2CH_3$ | 15 | $\overset{O}{\underset{O}{S}}$ | | | | | 33.7 | 6.3 | 107 / 88 | 0.67 |
| 10 | $-\bigcirc-Cl$ | 15 | S | | Mouse pinworms / Trichophyton mentagrophytes / Lone Star tick | 20 / 100 / 500 | 100 / 100 / 100 | | | | |
| 11 | $-(CH_2)_9-\bigcirc-CH_3$ | 20 | $\overset{O}{\underset{O}{S}}$ | | | | | 31.7 | 4.3 | 29 / 24 | 0.51 |
| 12 | $-CH_2-\bigcirc$ | 19 | S | | | | | 35.6 | 5.4 | 30 / 28 | 0.54 |
| 13 | $-CH_2CH_2-\bigcirc$ | 20 | S | | | | | 35.1 | 5.2 | 29 / 22 | 0.58 |
| 14 | $-CH_2CH_2-\bigcirc-OCH_2CH_2)_{15}-O-\bigcirc-(C_9H_{19})$ | 15 | S | | | | | 36.5 | 5.0 | 48 / 40 | 0.45 |
| 15 | Same as above | 15 | $\overset{O}{\underset{O}{S}}$ | | 2-spotted spider mite / Cercospora beticola / Candida albicans | 500 / 100 | 100 – / 100 – | 31.8 | 3.0 | 34 / 29 | 0.68 |

TABLE II—Continued

| Example Number | Compound | | | Biological activity | | | Surfactant profile | | | | |
| --- | --- | --- | --- | --- | --- | --- | --- | --- | --- | --- | --- |
| | $R_0$ | $n$ | $A$ | Species | Conc. (p.p.m.) | Percent kill | Surface tension (dynes/cm.) | Interfacial tension (dynes/cm.) | Foam height (mm.) | | Wetting time (mins.) |
| | | | | | | | | | 0 min. | 5 min. | |
| 16 | $-CH_2CH_2$(-$OCH_2CH_2$-)$_9$-O-⟨C_9H_{19}⟩ | 9 | S | | | | | | | | |
| 17 | Same as above | 9 | $O=\overset{O}{\underset{\uparrow}{S}}=O$ | Cercospora beticola<br>Candida albicans | 100<br>100 | 100<br>100 | | | | | |
| 18 | $-CH_2CH_2$(-$OCH_2CH_2$-)$_{15}$-O-⟨C_9H_{19}⟩ | 15 | $\overset{O}{\underset{\uparrow}{S}}$ | | | | 32.4 | 6.0 | 40 | 16 | 0.67 |
| 19 | $-CH_2CH_2CH_3$ | 15 | S | | | | 31.4 | 3.4 | 70 | 14 | 0.17 |
| 20 | $-C_8H_{17}$ | 23 | S | | | | | | | | |
| 21 | $-CH_2-$⟨⟩<br>$-CH_2-$ | 9 | S | | | | 32.6 | 9.2 | 20 | 13 | 4.68 |
| 22 | $-CH_2CH_2$(-$OCH_2CH_2$-)$_{40}$-O-⟨C_9H_{19}⟩ | 40 | S | | | | | | | | |

[1] In Examples 1–19 and 22, R=⟨C_9H_{19}⟩-; in Example 20, R=C_{12}H_{25}-; in Example 21, R=(C_{12-16}H_{25-33})-; in Examples 1–21, R_1=H, while in Example 22, R_1=—CH_3.

We claim.
1. A compound of the formula

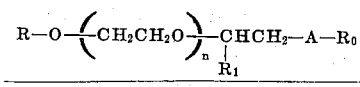

wherein:
a. R is an alkyl group of from 10 to 18 carbon atoms, or an alkylphenyl group of 14–24 carbon atoms,
b. Each $n$ is an integer of from 5 to 50,
c. A is a divalent sulfur,
d. $R_1$ is hydrogen or an alkyl group of from one to four carbon atoms, and
e. $R_0$ is an alkyl group of from one to 12 carbon atoms, an aryl hydrocarbon of no more than 10 carbon atoms, a halophenyl group, a halophenethyl group, a halobenzyl group, where, in said halophenyl, halophenethyl and halobenzyl groups, the halogen is Cl or Br, or a group of the formula

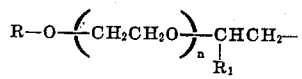

wherein: R, $R_1$ and $n$ are as defined above.

2. The compound of claim 1 wherein R is an alkylphenyl group of 14 to 18 carbon atoms.

3. The compound of claim 1 wherein R is a straight chain alkyl group of 12 to 16 carbon atoms.

4. The compound of claim 1 wherein $n$ is 15 to 40.

5. The compound of claim 1 wherein $R_0$ is a halophenyl group.

6. The compound of claim 1 wherein $R_0$ is

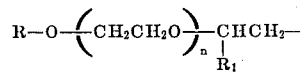

R, $n$ and $R_1$ being the same on both sides of —A—.

7. The compound of claim 1 wherein R is an alkyl group of 12 to 16 carbon atoms, $n$ is 15 to 40, A is —S— and $R_0$ is an alkyl group of 12 to 16 carbon atoms.

8. The compound of claim 7 wherein $R_0$ is an alkyl group of three to eight carbon atoms.

9. A compound of the formula

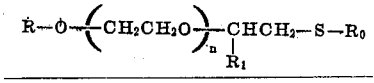

wherein
a. R is an alkyl group of from 10 to 18 carbon atoms, or an alkylphenyl group of 14–24 carbon atoms,
b. $n$ is an integer of from 5 to 50,
c. $R_1$ is hydrogen or an alkyl group of from one to four carbon atoms, and
d. $R_0$ is an alkyl group of from three to eight carbon atoms.

* * * * *